United States Patent
Fung et al.

(10) Patent No.: US 9,474,412 B2
(45) Date of Patent: Oct. 25, 2016

(54) SMOKE FILTER SYSTEM FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 346 days.

(21) Appl. No.: 13/958,724

(22) Filed: Aug. 5, 2013

(65) Prior Publication Data

US 2015/0033957 A1    Feb. 5, 2015

(51) Int. Cl.
| | |
|---|---|
| A47J 37/00 | (2006.01) |
| A47J 37/06 | (2006.01) |
| B01D 46/42 | (2006.01) |
| B01D 46/00 | (2006.01) |
| A21B 5/02 | (2006.01) |
| A47J 36/38 | (2006.01) |

(52) U.S. Cl.
CPC ............ *A47J 37/0611* (2013.01); *A21B 5/023* (2013.01); *A47J 36/38* (2013.01); *B01D 46/0036* (2013.01); *B01D 46/4227* (2013.01); *Y10T 29/49002* (2015.01)

(58) Field of Classification Search
CPC .................... A47J 37/0611; A47J 2037/0617; A21B 5/023
USPC ......... 99/372, 373, 374, 375, 376, 377, 378, 99/379, 380; 219/524, 450.1
See application file for complete search history.

(56) References Cited

U.S. PATENT DOCUMENTS

| | | | |
|---|---|---|---|
| 2,033,060 A | 3/1936 | Anderson | |
| 2,057,501 A | 10/1936 | Parr | |
| 2,607,287 A | 8/1952 | Price | |
| 2,719,903 A | 10/1955 | Oertli | |
| 4,036,995 A | 7/1977 | Koether et al. | |
| 4,088,067 A | 5/1978 | Kaebitzsch et al. | |
| 4,206,345 A | 6/1980 | Maass et al. | |
| 4,697,504 A | 10/1987 | Keating | |
| 4,776,319 A * | 10/1988 | Colangelo et al. | 126/41 R |
| 4,989,580 A * | 2/1991 | Dunham | 126/41 R |
| 5,237,914 A | 8/1993 | Carstensen | |
| 5,467,696 A | 11/1995 | Everhart | |
| 5,531,155 A | 7/1996 | Pellicane et al. | |
| 5,712,466 A | 1/1998 | Spicer | |
| 5,758,568 A | 6/1998 | Moravec | |
| 5,848,567 A | 12/1998 | Chiang | |
| 5,992,302 A | 11/1999 | Geisler | |
| 6,062,130 A | 5/2000 | Brady | |
| D436,498 S | 1/2001 | Carlson et al. | |
| 6,389,959 B1 | 5/2002 | Robertson | |
| 6,439,108 B1 | 8/2002 | Wu | |
| RE37,988 E | 2/2003 | Uss | |
| 6,539,842 B1 | 4/2003 | Chapman et al. | |

(Continued)

FOREIGN PATENT DOCUMENTS

EP     2062514     * 5/2009 .......... A47J 37/0611

*Primary Examiner* — Reginald L Alexander
(74) *Attorney, Agent, or Firm* — Grogan, Tuccillo & Vanderleeden, LLP

(57) ABSTRACT

A cooking appliance includes a lower housing having a lower heating surface and an upper housing operatively connected to the lower housing. The upper housing has an upper heating surface and an air inlet at least partially surrounding the upper heating surface. The cooking appliance further includes a filter disposed in the air inlet. The filter is configured to remove particulates from air passing through the air inlet.

14 Claims, 6 Drawing Sheets

(56) References Cited

U.S. PATENT DOCUMENTS

| | | |
|---|---|---|
| 6,591,740 B1 | 7/2003 | Hsu |
| 6,595,116 B1 | 7/2003 | Lin |
| 6,705,306 B1 | 3/2004 | Dickey |
| 6,747,250 B1 * | 6/2004 | Cha .............................. 219/400 |
| 7,514,655 B2 | 4/2009 | Fernandez et al. |
| 7,608,803 B2 | 10/2009 | Jerovsek |
| 7,717,028 B2 | 5/2010 | Serra |
| 7,960,673 B2 * | 6/2011 | Li et al. .................... 219/450.1 |
| 8,122,816 B2 | 2/2012 | Yu |
| 8,261,657 B2 | 9/2012 | Serra et al. |
| 2004/0074398 A1 | 4/2004 | Griffin et al. |
| 2005/0139086 A1 | 6/2005 | McHutchison |
| 2009/0165774 A1 | 7/2009 | Johnston et al. |
| 2012/0137897 A1 | 6/2012 | Tahincioglu |

* cited by examiner

SMOKE FILTER SYSTEM FOR A COOKING APPLIANCE

FIELD OF THE INVENTION

The present invention relates to cooking appliances and, more particularly, to a smoke filter system for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience and cleanliness. As will be readily appreciated, it is typical that smoke is generated during cooking due to the contact of food items or fluids with the heating surfaces. This smoke may contain objectionable odors. Accordingly, there is a need for a smoke filter system that reduces or contains the smoke and associated foul odors expelled from the cooking appliance during cooking.

SUMMARY OF THE INVENTION

It is an object of the present invention to provide a cooking appliance having a smoke filter system.

It is another object of the present invention to provide a cooking appliance having a smoke filter system for reducing smoke and associated foul odors generated during cooking.

It is another object of the present invention to provide a cooking appliance having a smoke filter system that removes impurities and particulates from smoke.

These and other objects are achieved by the present invention.

According to an embodiment of the present invention a cooking appliance includes a lower housing having a lower heating surface and an upper housing operatively connected to the lower housing. The upper housing has an upper heating surface and an air inlet at least partially surrounding the upper heating surface. The cooking appliance further includes a filter disposed in the air inlet. The filter is configured to remove particulates from air passing through the air inlet.

According to another embodiment of the present invention a smoke filter system for a cooking appliance having a lower housing having a lower heating plate, and an upper housing operatively connected to said lower housing and having an upper heating plate and an air inlet at least partially surrounding the upper heating plate is provided. The smoke filter system includes a filter assembly positioned in the air inlet. The filter assembly includes a filter configured to remove particulates from air passing through the air inlet.

According to yet another embodiment of the present invention, a method of reducing smoke and associated odors in a cooking appliance having a lower housing having a first heating surface, and an upper housing operatively connected to the lower housing and having a second heating surface and an air inlet at least partially surrounding the second heating surface is provided. The method includes the steps of operatively connecting the upper housing with the lower housing such that the first heating surface is positioned in opposition to the second heating surface, and equipping the cooking appliance with a filter in the air inlet. The filter is configured to remove particulates from air passing through the air inlet.

BRIEF DESCRIPTION OF THE DRAWINGS room The present invention will be better understood from reading the following description of non-limiting embodiments, with reference to the attached drawings, wherein below:

DETAILED DESCRIPTION OF THE PREFERRED EMBODIMENTS

Figure 1:
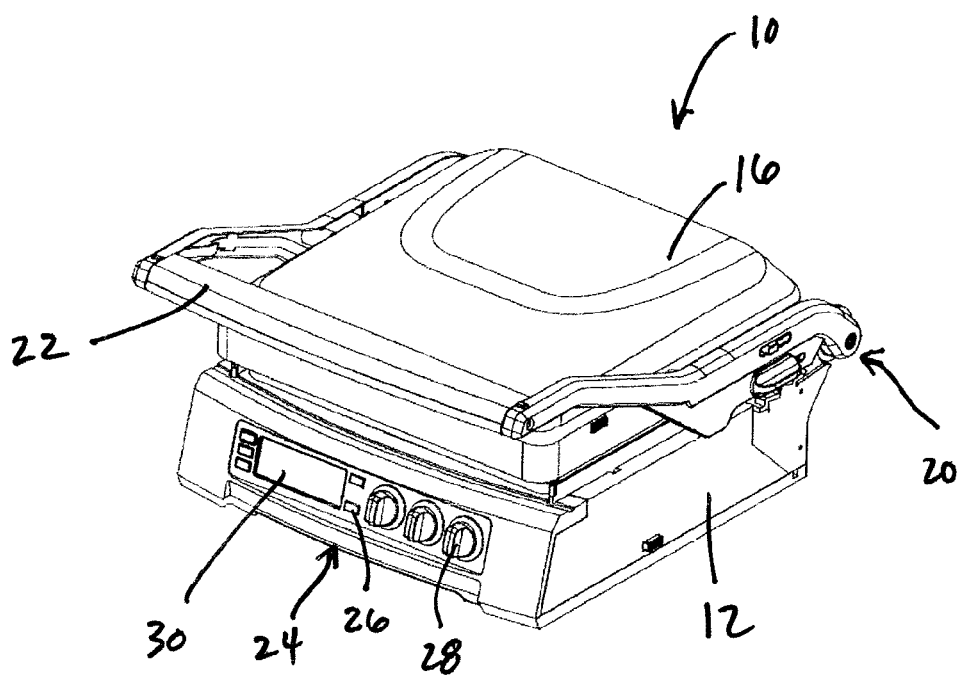
FIG. 1 is a perspective front view of a cooking appliance according to an embodiment of the present invention.
Figure 2:
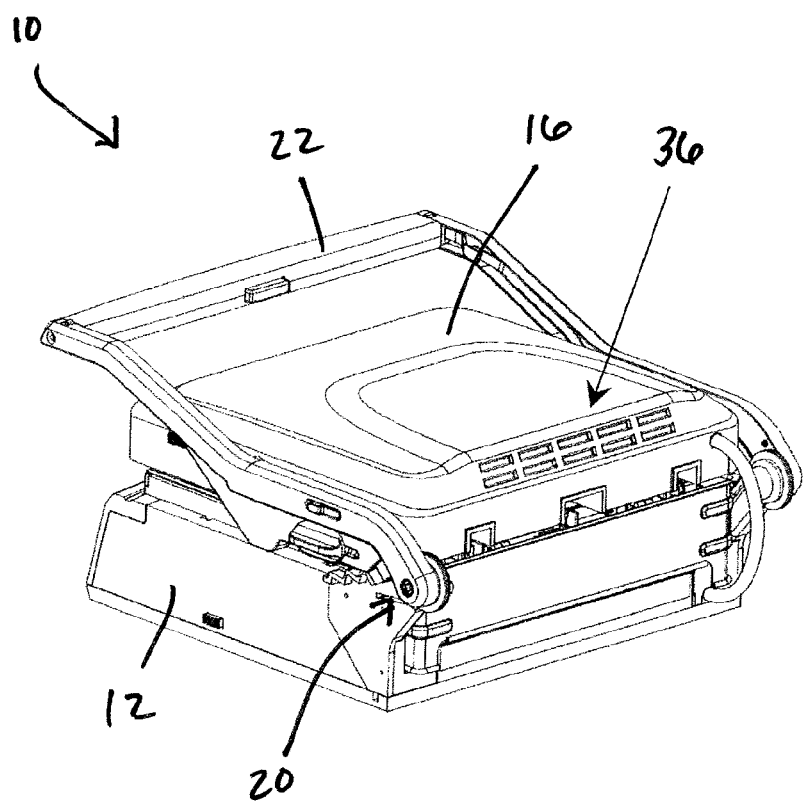
FIG. 2 is a perspective rear view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18.

As best shown in FIG. 2, the upper housing 16 is operatively connected to the lower housing 12 at a rear hinge 20. A handle 22 is attached to the upper housing 16 and allows a user to raise and lower the upper housing 16, via rotation about the hinge 20, in order to selectively position the upper housing 16 in various positions in relation to the lower housing 12.

With further reference to FIGS. 1 and 2, the cooking appliance 10 includes a control panel 24 having an array of buttons 26 and rotatable knobs 28 that allow a user to select and set a variety of cooking and heating parameters, and an LCD screen 30 that allows a user to view the parameters being set, as well as to monitor the cooking process.

Figure 3:
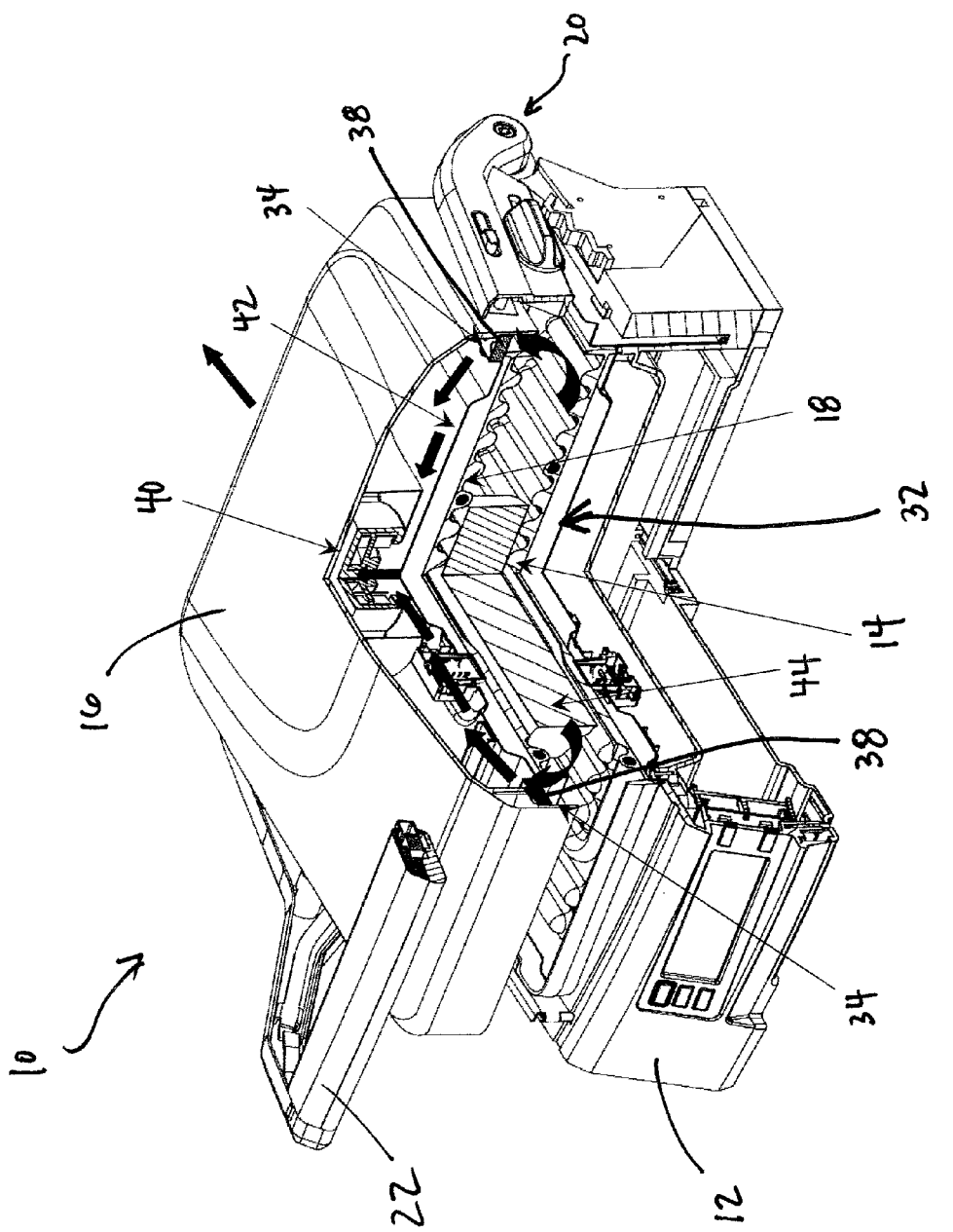
FIG. 3 is a partial cross-sectional view of the cooking appliance of FIG. 1, illustrating a smoke exhaust and smoke filter system of the cooking appliance.
Figure 4:
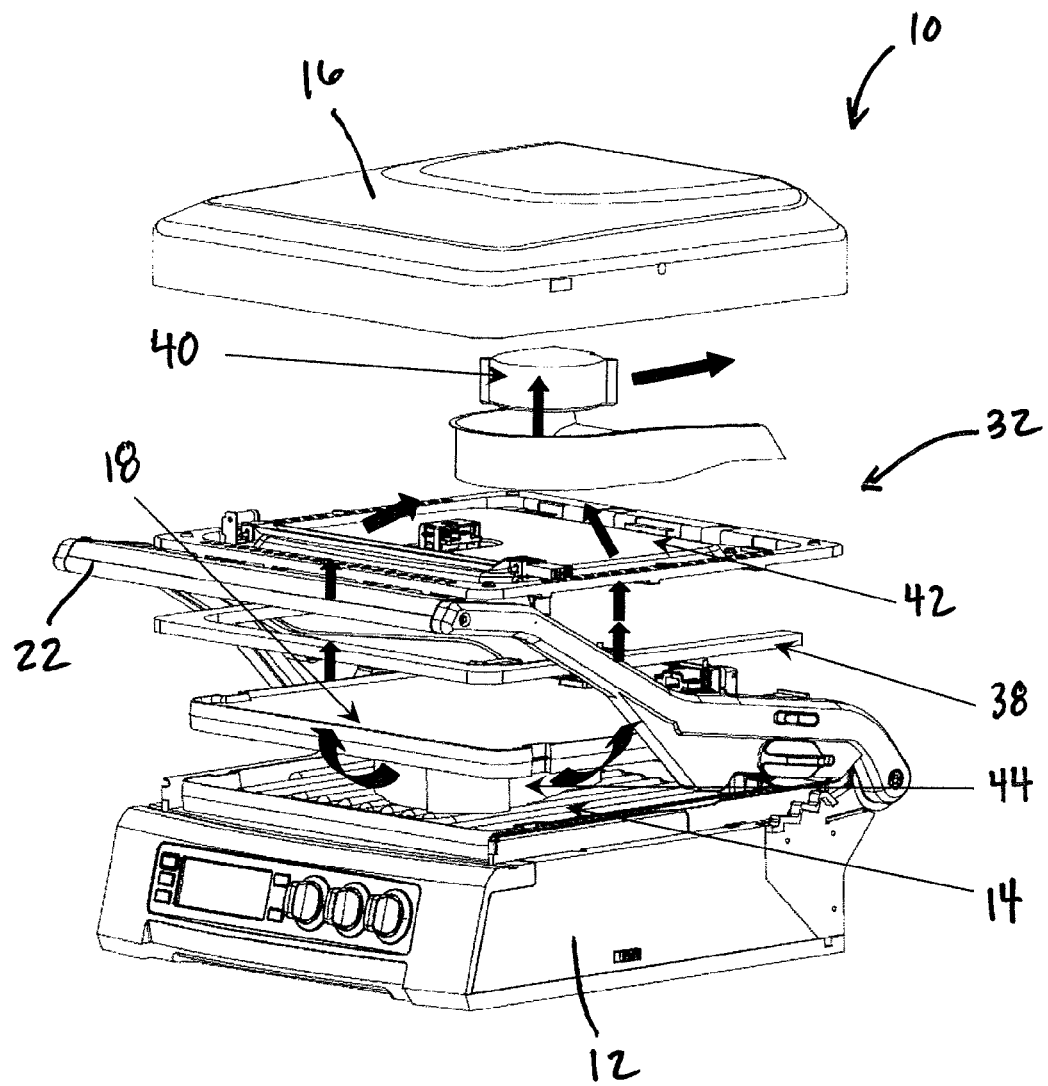
FIG. 4 is a partial exploded view of the cooking appliance of FIG. 1, illustrating the smoke exhaust and smoke filter system.

Turning now to FIGS. 3 and 4, the cooking appliance 10 also includes a smoke exhaust system 32 for containing and filtering smoke generated during the cooking process. As best shown in FIG. 3, the smoke exhaust system 32 includes an air inlet 34 on the bottom surface of the upper housing 16 along an outer periphery thereof (between the upper heating plate 18 and the edge of the upper housing 16), and an exhaust vent 36 formed in the rear of the upper housing 16. A filter assembly 38 is selectively positionable in the inlet 34. The smoke exhaust system 32 further includes an exhaust fan 40 disposed within the upper housing above the upper heating plate 18 (and above the upper reflector plate 42 contained within the upper housing 16 atop the upper heating plate 18).

Figure 6:
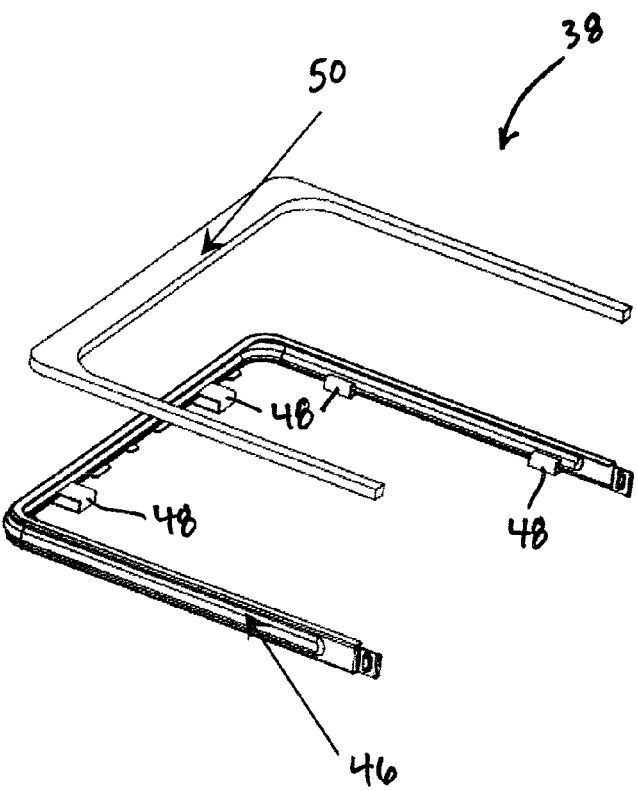
FIG. 6 is an exploded perspective view of the filter assembly of FIG. 5.

As best shown in FIGS. 3, 4 and 6, during cooking of a food item 44, smoke may be generated due to the food item 44 or fluids from the food item 44 being in prolonged contact with one or both of the upper heating plate 18 and the lower heating plate 14. As shown therein, the arrows denote hot smoke generated during cooking and the pathway through which the smoke travels throughout the smoke exhaust system 32. In operation, as hot smoke is generated, it rises up and is drawn into the air inlet 34 and through the air filter assembly 38 by the fan 40. The filter assembly 38 functions to remove particulates and impurities in the smoke (which give to smoke its objectionable and foul odor) as it travels therethrough. Once the smoke is purified it is exhausted as clean hot air through the exhaust vent 36 in the rear of the upper housing 18 by the fan 40.

Importantly, as the fan 40 draws air/smoke from between the upper and lower heating plates 18, 14 into the upper housing 18, such smoke is prevented from escaping the area between the heating plates 14, 18 other than through the air inlet 34 and the filter assembly 38. In this manner, generated smoke is contained, filtered, and exhausted as clean air by the smoke exhaust system 32. As will be readily appreciated, smoke and associated foul odors expelled from the appliance during cooking are therefore substantially reduced or eliminated.

Figure 5:
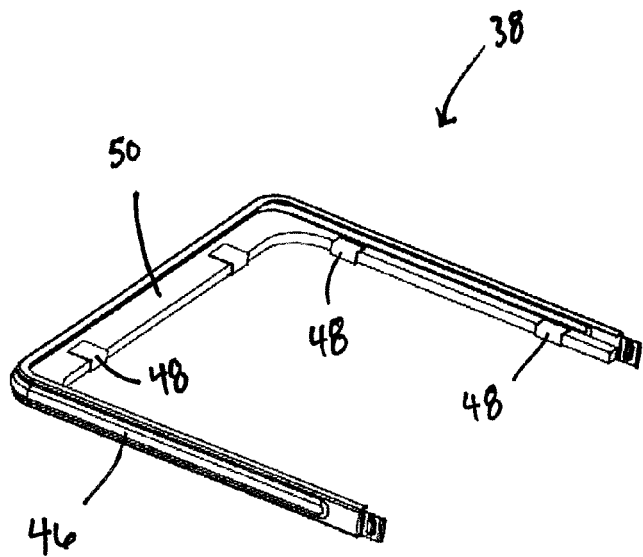
FIG. 5 is a perspective view of a filter assembly of the smoke exhaust and smoke filter system of FIG. 3.

Turning now to FIGS. 5 and 6, the filter assembly 38 is shown. The filter assembly 38 is substantially U-shaped and includes a U-shaped filter bracket 46 having retaining clips 48 for retaining a correspondingly shaped filter 50. In the preferred embodiment, the filter 38 is an activated carbon cotton filter, although other types of filters known in the art that capable of removing impurities and particulates from smoke may also be utilized without departing from the broader aspects of the present invention. As will be readily appreciated, the filter assembly 38 surrounds the upper heating plate 18 on the front and sides thereof.

Figure 7:
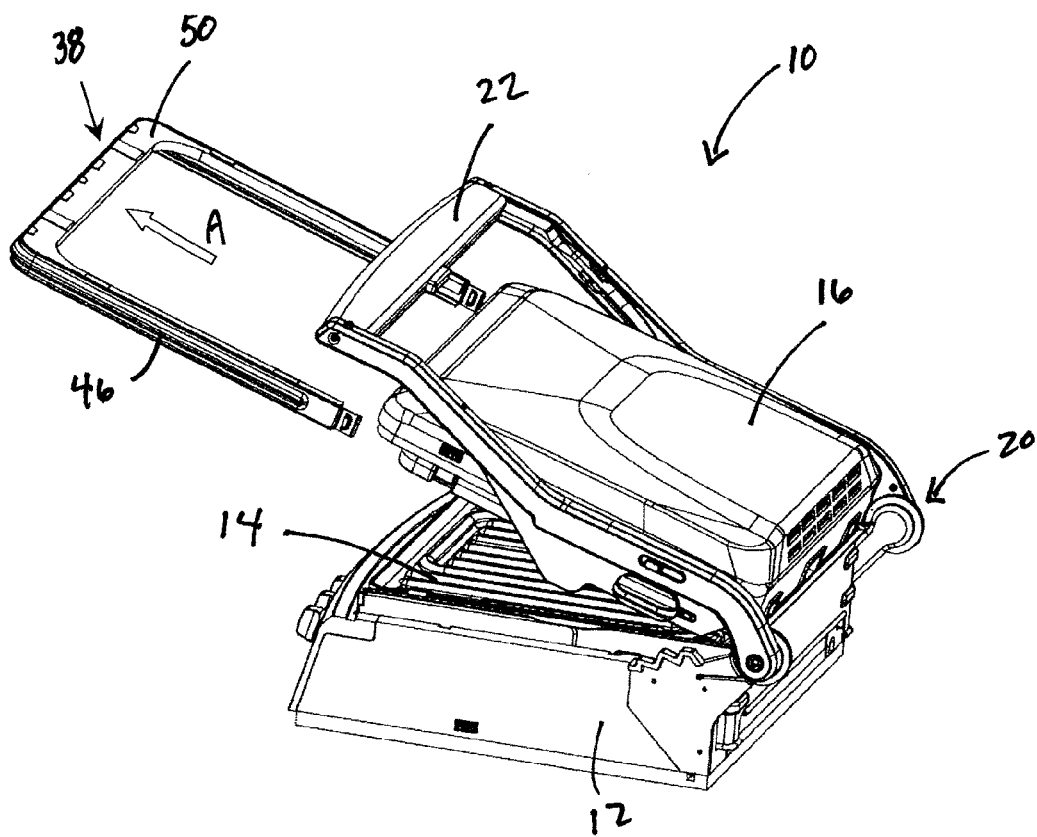
FIG. 7 is a perspective view of the cooking appliance of FIG. 1, illustrating removal of the filter assembly.
Figure 8:
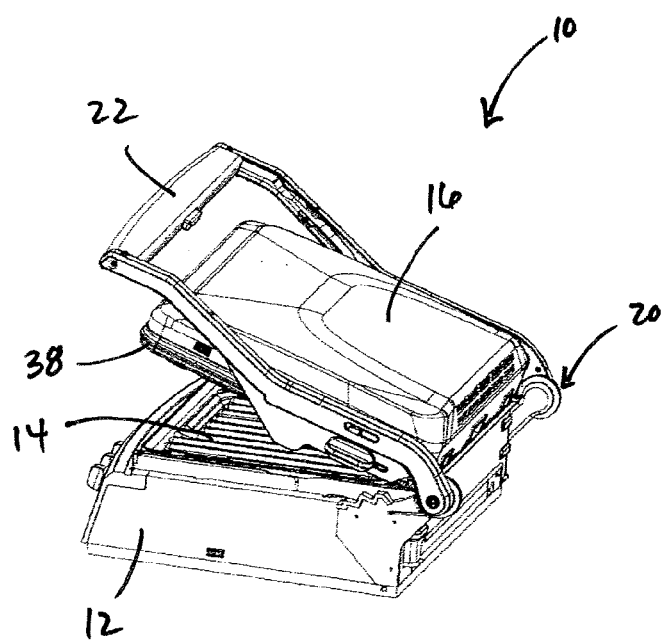
FIG. 8 is a perspective view of the cooking appliance of FIG. 1, illustrating the filter assembly in an installed position.

Importantly, the filter assembly 38 is selectively removable from the cooking appliance 10 to allow for cleaning or replacement of the filter 50, in the manner illustrated in FIG. 7. In particular, when replacement of the filter 50 is necessary, a user may lift up on the handle 20 and remove the filter assembly 38 by pulling in the direction of arrow A. Once the filter assembly 38 is removed, the filter 50 may be removed therefrom and replaced with a new filter. The entire assembly 38 may then be installed on the cooking appliance 10 in the position shown in FIG. 8. Alternatively, the entire assembly 38, including the filter bracket 46 and filter 50, may be replaceable.

Figure 9:
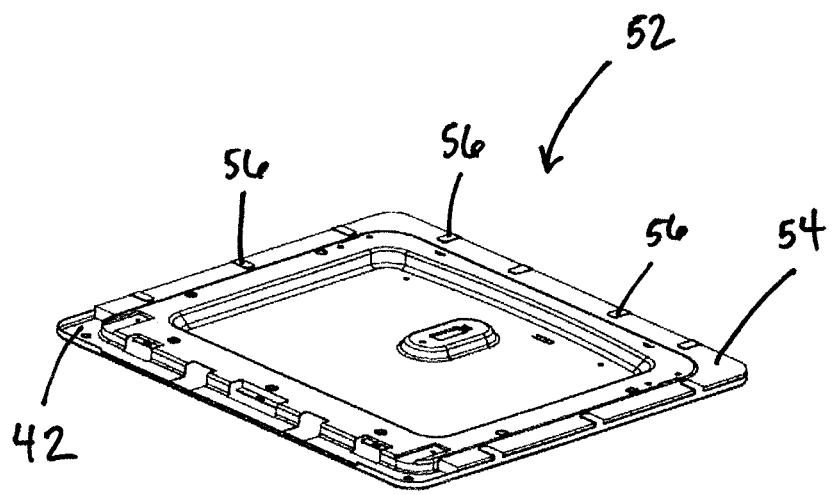
FIG. 9 is a perspective view of an alternative filter assembly for use with the cooking appliance of FIG. 1.
Figure 10:
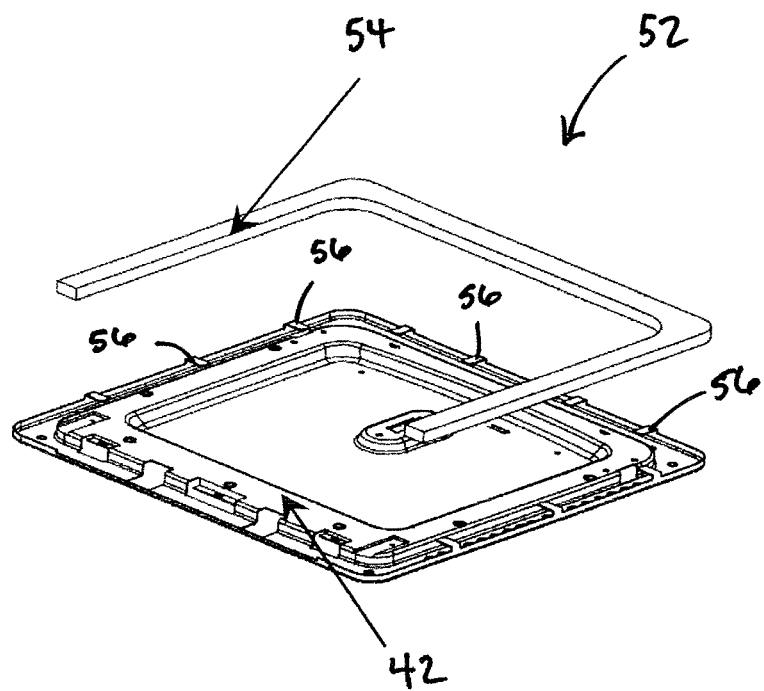
FIG. 10 is an exploded perspective view of the filter assembly of FIG. 9.

With reference to FIGS. 9 and 10, an alternative filter assembly 52 for use with the cooking appliance 10 is shown. As shown therein, the filter assembly 52 includes a filter 54 that is mounted to the upper reflector plate 42 and retained in place by retaining clips 56.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   a lower housing having a lower heating surface;
   an upper housing operatively connected to said lower housing, said upper housing having an upper heating surface and an air inlet at least partially surrounding said upper heating surface;
   a filter disposed in said air inlet, said filter being configured to remove particulates from air passing through said air inlet;
   an upper reflector plate disposed substantially above said upper heating plate in said upper housing; and
   wherein said filter is coupled to said upper reflector plate, said filter and said reflector plate defining a filter assembly.

2. The cooking appliance of claim 1, wherein:
   said filter is coupled to a filter bracket, said filter and said filter bracket defining a filter assembly.

3. The cooking appliance of claim 2, wherein:
   said filter assembly is substantially U-shaped.

4. The cooking appliance of claim 2, wherein:
   said filter assembly is removable from said cooking appliance.

5. The cooking appliance of claim 2, wherein:
   said filter is removable from said filter bracket.

6. The cooking appliance of claim 2, wherein:
   said filter is an activated carbon cotton filter.

7. The cooking appliance of claim 4, further comprising:
   a handle connected to said upper housing, said handle being operable to selectively move said upper housing in relation to said lower housing and to allow removal of said filter assembly.

8. A smoke filter system for a cooking appliance having a lower housing having a lower heating plate, and an upper housing operatively connected to said lower housing and having an upper heating plate and an air inlet at least partially surrounding said upper heating plate, said smoke filter system comprising:
   a filter assembly positioned in said air inlet, said filter assembly including a filter configured to remove particulates from air passing through said air inlet; and
   said filter is coupled to an upper reflector plate of said cooking appliance, said filter and said upper reflector plate defining said filter assembly.

9. The smoke filter system of claim 8, wherein:
   said filter is coupled to a filter bracket, said filter bracket and said filter defining said filter assembly.

10. The smoke filter system of claim 8, wherein:
    said filter is an activated carbon cotton filter.

11. The smoke filter system of claim 9, wherein:
    said filter assembly is removable from said cooking appliance.

12. The smoke filter system of claim 9, wherein:
    said filter assembly is removable from said cooking appliance.

13. The smoke filter system of claim 9, wherein:
    said filter assembly is substantially U-shaped.

14. The smoke filter system of claim 9, wherein:
    said cooking appliance includes a handle connected to said upper housing, said handle being operable to selectively move said upper housing in relation to said lower housing and to allow removal of said filter assembly.

\* \* \* \* \*